US009131144B2

(12) United States Patent
Park

(10) Patent No.: US 9,131,144 B2
(45) Date of Patent: Sep. 8, 2015

(54) APPARATUS AND METHOD FOR CONTROLLING FOCUS

(71) Applicant: Samsung Electronics Co., Ltd., Suwon-si, Gyeonggi-do (KR)

(72) Inventor: Gwang-Ha Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 13/863,708

(22) Filed: Apr. 16, 2013

(65) Prior Publication Data

US 2013/0271637 A1 Oct. 17, 2013

(30) Foreign Application Priority Data

Apr. 17, 2012 (KR) ........................ 10-2012-0039670

(51) Int. Cl.
*H04N 5/222* (2006.01)
*H04N 5/232* (2006.01)
*G03B 13/00* (2006.01)

(52) U.S. Cl.
CPC ....... *H04N 5/23212* (2013.01); *H04N 5/23216* (2013.01); *H04N 5/23245* (2013.01); *H04N 5/23293* (2013.01)

(58) Field of Classification Search
CPC .......... H04N 5/23293; H04N 5/23212; H04N 5/772; H04N 2101/00; G03B 13/36
USPC ......... 348/345–349, 333.01–333.02; 345/173
See application file for complete search history.

(56) References Cited

U.S. PATENT DOCUMENTS

| 7,620,316 | B2 | 11/2009 | Boillot |
| 8,203,640 | B2* | 6/2012 | Kim et al. ............... 348/333.12 |
| 2010/0020221 | A1* | 1/2010 | Tupman et al. .......... 348/333.01 |
| 2010/0156941 | A1 | 6/2010 | Seung |
| 2011/0013072 | A1 | 1/2011 | Choi |
| 2011/0019058 | A1 | 1/2011 | Sakai et al. |
| 2011/0267530 | A1 | 11/2011 | Chun |
| 2011/0267531 | A1* | 11/2011 | Imai ........................ 348/333.12 |
| 2012/0069235 | A1* | 3/2012 | Imai ........................ 348/333.11 |
| 2012/0242852 | A1* | 9/2012 | Hayward et al. .......... 348/222.1 |

FOREIGN PATENT DOCUMENTS

JP 11-212726 A 8/1999

* cited by examiner

*Primary Examiner* — Kelly L Jerabek
(74) *Attorney, Agent, or Firm* — Jefferson IP Law, LLP

(57) ABSTRACT

A focus control apparatus and method for controlling the focus manually is provided. The focus control apparatus includes a shutter button, a display for displaying an image whose focus is changed depending on a moving direction of a drag occurring after the shutter button is touched in a preview mode, and a controller for controlling the display to display the image whose focus is changed depending on the moving direction of the drag occurring after the shutter button is touched in the preview mode.

19 Claims, 4 Drawing Sheets

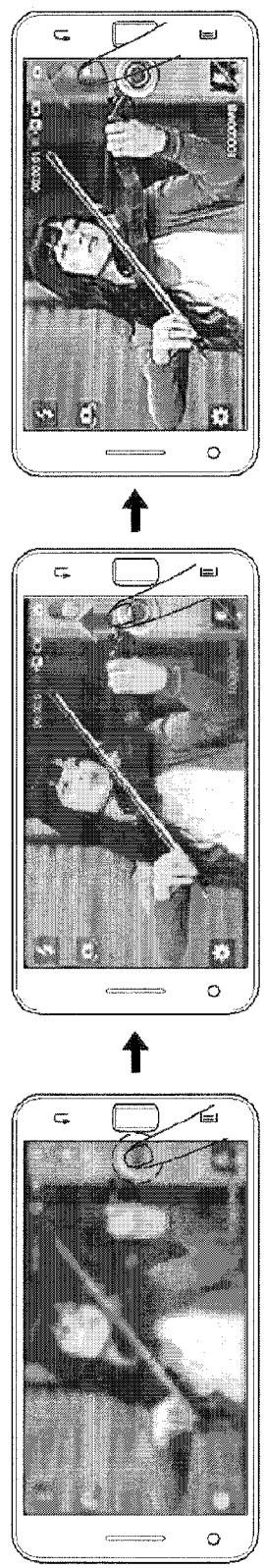

APPARATUS AND METHOD FOR CONTROLLING FOCUS

PRIORITY

This application claims the benefit under 35 U.S.C. §119(a) of a Korean patent application filed in the Korean Intellectual Property Office on Apr. 17, 2012 and assigned Serial No. 10-2012-0039670, the entire disclosure of which is hereby incorporated by reference.

BACKGROUND OF THE INVENTION

1. Field of the Invention

The present invention relates to an apparatus and method for controlling a focus. More particularly, the present invention relates to a focus control apparatus and method for controlling the focus manually.

2. Description of the Related Art

Mobile terminals may be configured to perform various functions such as data/voice communication, photo/video shooting with a camera, voice recording, music file playback through a speaker system, image/video displaying, and the like. While some mobile terminals include additional functions capable of running games, other mobile terminals may be implemented as multimedia devices. Moreover, mobile terminals may allow users to receive broadcast or multicast signals and watch videos and television programs.

Recently, efforts have been made to support and enhance many new functions of the mobile terminals in addition to the above-mentioned functions. These efforts may include not only modifying and improving structural components constituting the mobile terminals, but also adding and improving software and hardware.

Mobile terminals provide an Auto Focus (AF) function so that users may easily capture (or shoot) photos or videos using a camera mounted in the mobile terminals. The AF function, which automatically adjusts the focus of a camera during shooting, may allow even a user unfamiliar with the camera to capture quality photos or videos. Thus, along with the development of the camera specifications, the importance of the AF function has increased.

In implementation however, for example in barcode recognition applications, the AF may not be performed correctly in low-light or close-up shooting environments.

In these environments, though the user may determine that the focus has been properly aligned, a lens unit for a focusing operation may be misaligned since the AF operation has failed. Therefore, a need exists for an improved apparatus and method for controlling a focus.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a focus control apparatus and method for controlling the focus manually.

In accordance with an aspect of the present invention, an apparatus for controlling a focus is provided. The apparatus includes a shutter button, a display for displaying an image whose focus is changed depending on a moving direction of a drag occurring after the shutter button is touched in a preview mode, and a controller for controlling the display to display the image whose focus is changed depending on the moving direction of the drag occurring after the shutter button is touched in the preview mode.

In accordance with another aspect of the present invention, a method for controlling a focus is provided. The method includes determining whether a drag occurs after a shutter button is touched in a preview mode, and displaying an image whose focus is changed depending on a moving direction of the drag, if the drag occurs after the shutter button is touched in the preview mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A to 4C show a change in an image by a manual focusing, for example the manual focusing in FIG. 2, according to an exemplary embodiment of the present invention.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
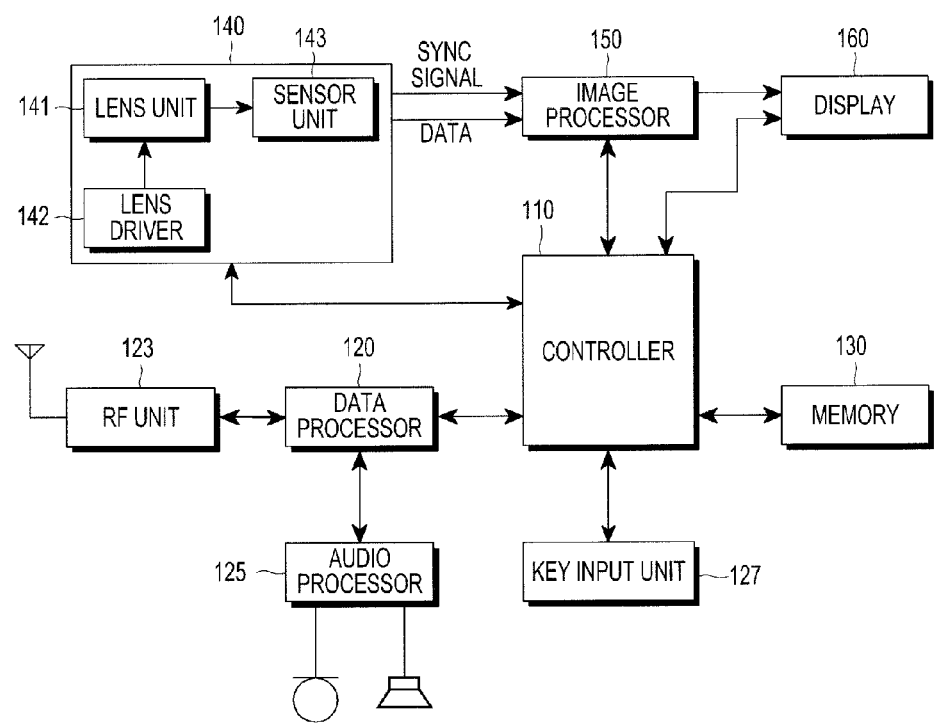
FIG. 1 shows a structure of a mobile terminal according to an exemplary embodiment of the present invention.

FIG. 1 shows a structure of a mobile terminal according to an exemplary embodiment of the present invention.

Referring to FIG. 1, a Radio Frequency (RF) unit 123 is responsible for wireless communication of the mobile terminal. The RF unit 123 includes an RF transmitter for up-converting a frequency of transmission signals and amplifying the up-converted transmission signals, and an RF receiver for low-noise-amplifying received signals and down-converting a frequency of the amplified received signals. A data processor 120 includes a transmitter for coding and modulating the transmission signals, and a receiver for demodulating and decoding the received signals. In other words, the data processor 120 may include a modulator/demodulator (modem) and a coder/decoder (codec). The codec includes a data codec for processing data signals such as packet data, and an audio codec for processing audio signals such as voice. An audio processor 125 plays received audio signals output from the audio codec in the data processor 120 using a speaker (SPK), and transfers transmission audio signals picked up by a microphone (MIC) to the audio codec in the data processor 120.

A key input unit 127 includes character/number keys for inputting character/number information, and function keys for setting various functions.

A memory 130 may include a program memory and a data memory. The program memory stores programs for controlling operations of the mobile terminal, and programs for performing a manual focus mode that displays an image whose focus is changed by moving a lens unit 141 corresponding to a moving direction of a drag occurring after a shutter button (or shutter release button) is touched in a preview mode according to an exemplary embodiment of the present invention. The data memory temporarily stores data generated during execution of the programs.

A controller 110 controls the overall operation of the mobile terminal.

In accordance with an exemplary embodiment of the present invention, the controller 110 displays an image whose focus is changed depending on a moving direction of a drag occurring after the shutter button is touched in the preview mode.

When a drag occurs after the shutter button is touched in the preview mode, the controller 110 switches to a manual focus mode in which it changes the focus of an image displayed in the preview mode by moving the lens unit 141 corresponding to a moving direction of the drag.

When a drag occurs in a manual focus control area after the shutter button is touched in the preview mode, the controller 110 switches to the manual focus mode.

The controller 110 determines a moving direction of a drag occurring after the shutter button is touched in the manual focus mode, and adjusts a distance between the lens unit 141 and a sensor unit 143 by moving the lens unit 141 depending on the moving direction of the drag.

The controller 110 captures an image whose focus has been aligned in the manual focus mode, if the touch is released while displaying an image whose focus is changed depending on a moving direction of a drag occurring after the shutter button is touched in the preview mode.

When the touch is released after the shutter button is touched in the preview mode, the controller 110 captures an image whose focus has been aligned in an automatic focus mode.

A camera unit 140 includes the lens unit 141 for capturing images, a lens driver 142 for moving the position of the lens unit 141, the sensor unit 143 for converting an optical signal captured by the lens unit 141 into an electrical signal, and a signal processor (not shown) for converting an analog image signal output from the sensor unit 143 into digital image data. In an exemplary implementation, the sensor unit 143 may be a Charge-Coupled Device (CCD) or Complementary Metal-Oxide Semiconductor (CMOS) sensor, and the signal processor may be implemented by a Digital Signal Processor (DSP). The sensor unit 143 and the signal processor may be implemented integrally or separately.

In accordance with an exemplary embodiment of the present invention, the lens driver 142 adjusts a distance between the lens unit 141 and the sensor unit 143 by driving (or moving) the lens unit 141 corresponding to a moving direction of a drag occurring after the shutter button is touched in the preview mode.

An image processor 150 performs Image Signal Processing (ISP) for displaying image signals output from the camera unit 140 on a display 160. The ISP includes functions such as gamma correction, interpolation, spatial variation, image effecting, image scaling, Auto White Balance (AWB), Auto Exposure (AE), and Auto Focus (AF). The image processor 150 processes image signals output from the camera unit 140 on a frame-by-frame basis, and outputs the frame image data according to the characteristics and size of the display 160. The image processor 150, which includes a video codec, compresses frame image data displayed on the display 160 using a predetermined coding scheme, and decompresses (or restores) the compressed frame image data into its original frame image data. The video codec may include a Joint Photographic Experts Group (JPEG) codec, a Moving Picture Experts Group 4 (MPEG4) codec, a Wavelet codec, etc. When supporting the On Screen Display (OSD) feature, the image processor 150 may output OSD data according to the size of a displayed screen, under control of the controller 110.

The display 160 displays, on a screen, image signals output from the image processor 150 and user data output from the controller 110. The display 160 may include a Liquid Crystal Display (LCD). In this case, the display 160 may include an LCD controller, a memory capable of storing image data, and an LCD panel. When supporting the touch screen feature, the LCD may serve as an input unit as well. In this case, the display 160 may display the same keys as those on the key input unit 127.

In accordance with an exemplary embodiment of the present invention, the display 160 displays an image whose focus is changed depending on a moving direction of a drag occurring after the shutter button is touched in the preview mode.

An exemplary operation of controlling the focus in a mobile terminal will be described in more detail with reference to FIGS. 2 to 4C.

Figure 2:
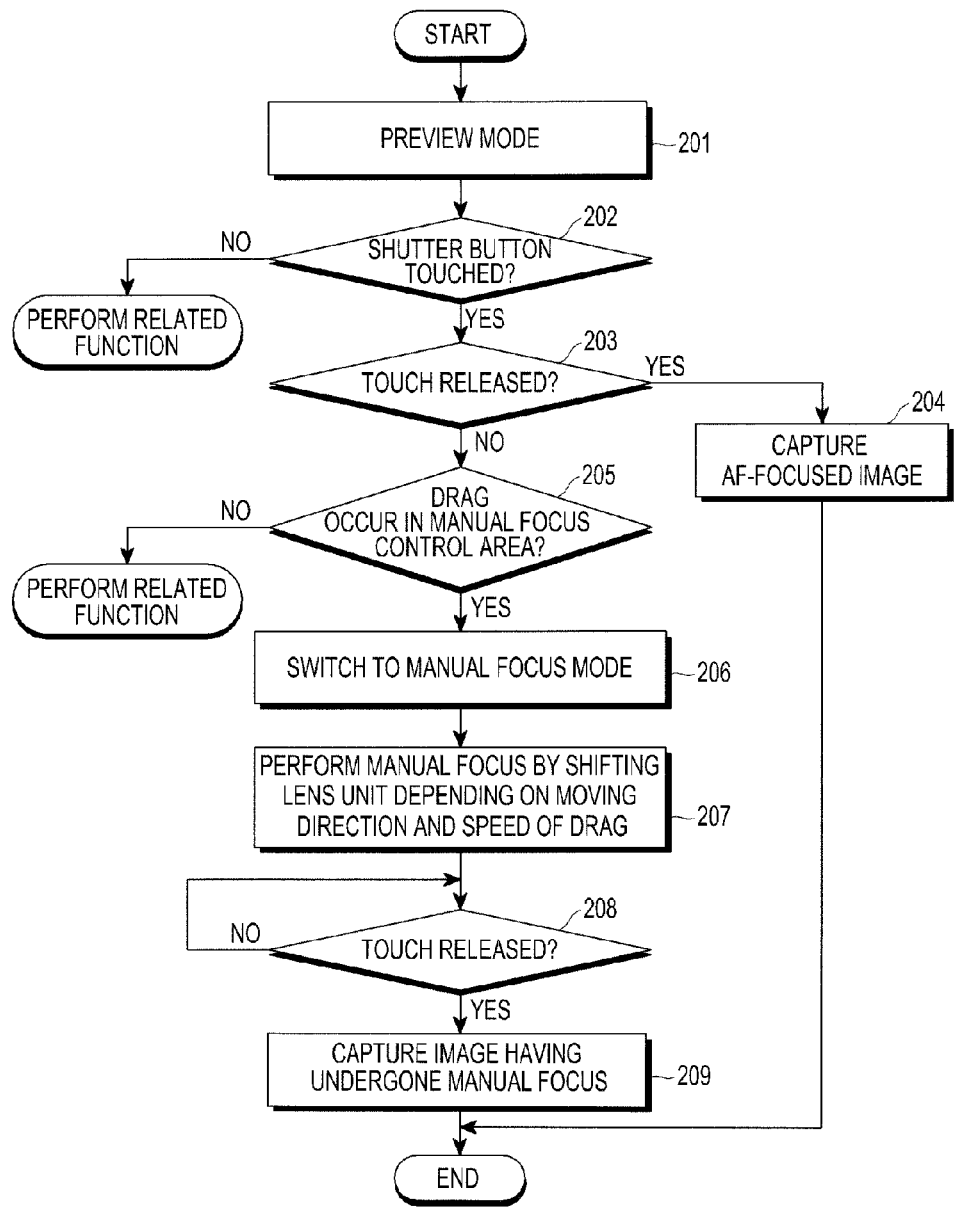
FIG. 2 shows an operation of controlling the focus in a mobile terminal according to an exemplary embodiment of the present invention.
Figure 3:
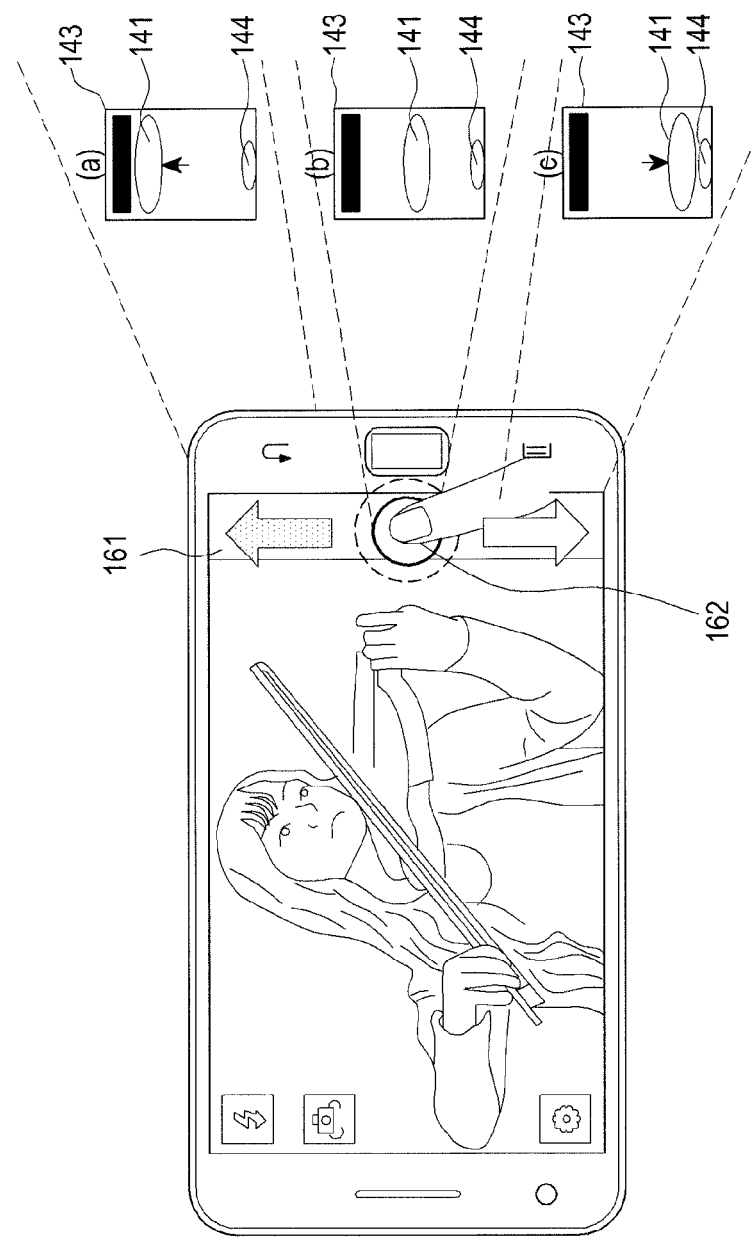
FIG. 3 shows a manual focus control operation, for example the manual focus control operation in FIG. 2, according to an exemplary embodiment of the present invention.

FIG. 2 shows an operation of controlling the focus in a mobile terminal according to an exemplary embodiment of the present invention, FIG. 3 shows an example of the manual focus control operation, for example the manual focus control operation in FIG. 2, according to an exemplary embodiment of the present invention, and FIGS. 4A to 4C show a change in an image by a manual focusing, for example the manual focus control operation in FIG. 2, according to an exemplary embodiment of the present invention.

An exemplary embodiment of the present invention will be described in more detail below with reference to FIGS. 2 to 4C together with FIG. 1.

Referring to FIG. 2, while displaying an image in a preview mode in step 201, the controller 110 determines in step 202 whether a shutter button displayed in a manual focus control area on the display 160 is touched.

If it is determined that the shutter button is not touched in step 202, the controller 110 performs a related function. On the other hand, if it is determined in step 202 that the shutter button is touched, the controller 110 determines in step 203 whether the touch is released. If the touch is released, the controller 110 captures, in step 204, an image whose focus has been aligned in an automatic focus mode to which the controller 110 is switched as a user touches the shutter button.

On the other hand, if it is determined in step 203 that the touch is not released, the controller 110 determines in step 205 whether a drag occurs in the manual focus control area after the shutter button is touched. If it is determined in step 205 that a drag does not occur, the controller 110 performs a related function. On the other hand, if the drag occurs, the controller 110 switches to a manual focus mode in step 206.

In step 207, in the manual focus mode, the controller 110 determines a moving direction of the drag occurring in the manual focus control area, and controls the lens driver 142 to move the lens unit 141 in a manner corresponding to the moving direction of the drag, thereby performing a manual focus function. Step 207 will be described in more detail with reference to FIG. 3.

Referring to FIG. 3, when a shutter button 162 included in a manual focus control area 161 is touched while an image is displayed in the preview mode, the lens unit 141 is positioned substantially in the middle between the sensor unit 143 and a hole 144, as shown in frame (b). If a drag occurs in the manual focus control area 161 after the shutter button 162 is touched, the mobile terminal switches to the manual focus mode. If a drag-up occurs in the manual focus mode, the controller 110 controls the lens unit 141, which is initially positioned as in frame (b), to be positioned closer to the sensor unit 143 as in frame (a) depending on the moving direction and speed of the drag. In contrast, if a drag-down occurs in the manual focus mode, the controller 110 controls the lens unit 141, which is initially positioned as in frame (b), to be positioned farther away from the sensor unit 143 and closer to the hole 144 as in frame (c) depending on the moving direction and speed of the drag.

FIGS. 4A to 4C show an operation in which the focus of an image displayed in the preview mode is changed depending on the movement of the drag. As illustrated in FIG. 4A, when a shutter button 162 included in a manual focus control area 161 is touched while an image is displayed in the preview mode, the lens unit 141 is initially positioned substantially in the middle between the sensor unit 143 and the hole 144, as shown in frame (b) of FIG. 3. As illustrated in FIGS. 4B and 4C, if a drag-up occurs, the lens unit 141, which is initially positioned as in frame (b) of FIG. 3, is positioned closer to the sensor unit 143 as in frame (a) of FIG. 3. As can be seen in FIGS. 4B and 4C, depending on the moving direction and speed of the drag as the drag-up occurs in the manual focus mode, the focus of the displayed image can be improved. Although not illustrated, a similarly enhanced focus of the displayed image may also be achieved by a drag-down operation in which, as illustrated in frame (c) of FIG. 3, the lens unit 141 is positioned further from the sensor unit 143.

In step 207, the controller 110 may change the focus of an image displayed on the display 160 in the preview mode by adjusting the distance between the lens unit 141 and the sensor unit 143 by moving the lens unit 141 depending on the moving direction and speed of a drag occurring by the user.

While the user views the image whose focus is changed by the drag-up/down in step 207, the controller 110 determines in step 208 whether the touch is released when the focused image is displayed. If the touch is released, the controller 110 captures the focused image in step 209.

Although it is assumed that the shutter button is included in the manual focus area and the mobile terminal is switched to the manual focus mode when a drag occurs in the manual focus area, the shutter button and the manual focus area may be separated from each other, and the area where a drag occurs for switching to the manual focus mode is not limited to the manual focus area.

The above-described exemplary embodiments of the present invention may be implemented in the form of hardware, software, or a combination thereof. When implemented by software, the exemplary embodiments of the present invention may be implemented as software that runs on one or more processors supporting a variety of Operating Systems (OSs) or platforms. This software may be created using any one of many suitable programming languages, and may be compiled into executable machine codes or intermediate codes, which run in a framework or virtual machine.

When the above-described exemplary embodiments of the present invention are executed on one or more processors, they may be implemented by a processor-readable recording medium (e.g., memories, floppy disks, compact disks, optical disks, magnetic tapes, etc.) in which one or more programs for performing a method of implementing the embodiments of the invention is recorded.

As is apparent from the foregoing description, exemplary embodiments of the present invention provide an apparatus and a method for automatically controlling the focus, making it possible to perform an AF operation by accessing the camera unit using the existing single frame thread without the need to create a separate AF thread for an AF operation, thereby addressing synchronization problems.

In addition, the loss of Central Processing Unit (CPU) resources may be reduced by processing AF by moving the lens unit on a frame-by-frame basis in the frame thread, and despite the change in the camera unit, the change in AF S/W of the camera driver for controlling the camera unit may be minimized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling a focus, the apparatus comprising:
a touch screen display configured to:
display a shutter button and an image having a focus that changes based on a moving direction of a drag starting from a location of the displayed shutter button and occurring after the shutter button is touched in a preview mode and before the touch is released; and
a controller configured to:
control the touch screen display to display the image; and
change the focus of the displayed image based on the moving direction of the drag starting from the location of the displayed shutter button and occurring after the shutter button is touched in the preview mode and before the touch is released.

2. The apparatus of claim 1, further comprising:
a lens unit configured to capture the image;
a lens driver configured to drive the lens unit in correspondence with the moving direction of the drag occurring after the shutter button is touched in the preview mode and before the touch is released; and
a sensor unit configured to convert an optical signal captured by the lens unit into an electrical signal.

3. The apparatus of claim 1, further comprising a lens unit, wherein, when a drag occurs after the shutter button is touched in the preview mode and before the touch is released, the controller is further configured to switch to a manual focus mode in which the controller changes a focus of an image displayed in the preview mode by moving the lens unit in correspondence with the moving direction of the drag.

4. The apparatus of claim 3, wherein the controller is further configured to switch to the manual focus mode when the drag occurs in a manual focus control area after the shutter button is touched in the preview mode.

5. The apparatus of claim 3, further comprising a sensor unit,
wherein the controller is further configured to:
determine the moving direction of the drag occurring after the shutter button is touched in the preview mode and before the touch is released; and
change a focus of an image displayed in the preview mode by adjusting a distance between the lens unit and the sensor unit by moving the lens unit based on the moving direction of the drag.

6. The apparatus of claim 1, wherein the controller is further configured to capture an image that has been focused in a manual focus mode, if the touch is released while displaying the image with the changed focus based on the moving direction of the drag occurring after the shutter button is touched in the preview mode and before the touch is released.

7. The apparatus of claim 1, wherein the controller is further configured to capture an image that has been focused in an automatic focus mode if the touch is released after the shutter button is touched in the preview mode and before a drag occurs.

8. A method for controlling a focus, the method comprising:
determining whether a drag starting from a location of a displayed shutter button occurs after the shutter button displayed on a touch screen display is touched in a preview mode and before the touch is released; and
displaying an image having a focus that changes based on a moving direction of the drag starting from the location of the displayed shutter button and occurring after the shutter button is touched in the preview mode and before the touch is released.

9. The method of claim 8, further comprising changing the focus of the image displayed in the preview mode by:
switching to a manual focus mode if the drag occurs after the shutter button is touched in the preview mode and before the touch is released; and
moving a lens unit in correspondence with the moving direction of the drag in the manual focus mode.

10. The method of claim 9, wherein the switching to the manual focus mode comprises switching to the manual focus mode if the drag occurs in a manual focus control area after the shutter button is touched in the preview mode.

11. The method of claim 9, wherein the moving of the lens unit comprises:
determining the moving direction of the drag in the manual focus mode; and
adjusting a distance between the lens unit and a sensor unit by moving the lens unit based on the moving direction of the drag.

12. The method of claim 9, further comprising capturing an image that has been focused in the manual focus mode if the touch is released while changing the focus of the image displayed in the preview mode based on the movement of the lens unit.

13. The method of claim 8, further comprising capturing an image that has been focused in an automatic focus mode if the touch is released after the shutter button is released in the preview mode and before a drag occurs.

14. A non-transitory computer-readable recording medium having a program recorded thereon, the program causing a computer to execute a method comprising:
determining whether a drag starting from a location of a displayed shutter button occurs after the shutter button displayed on a touch screen display is touched in a preview mode and before the touch is released; and
displaying an image having a focus that changes based on a moving direction of the drag starting from the location of the displayed shutter button and occurring after the shutter button is touched in the preview mode and before the touch is released.

15. The non-transitory computer-readable recording medium of claim 14, wherein the method further comprises changing the focus of the image displayed in the preview mode by:
switching to a manual focus mode if the drag occurs after the shutter button is touched in the preview mode and before the touch is released; and
moving a lens unit in correspondence with the moving direction of the drag in the manual focus mode.

16. The non-transitory computer-readable recording medium of claim 15, wherein the switching comprises switching to the manual focus mode if the drag occurs in a manual focus control area after the shutter button is touched in the preview mode.

17. The non-transitory computer-readable recording medium of claim 15, wherein the moving comprises:
determining the moving direction of the drag in the manual focus mode; and
adjusting a distance between the lens unit and a sensor unit by moving the lens unit based on the moving direction of the drag.

18. The non-transitory computer-readable recording medium of claim 15, wherein the method further comprises capturing an image that has been focused in the manual focus mode if the touch is released while changing the focus of the image displayed in the preview mode based on the movement of the lens unit.

19. The non-transitory computer-readable recording medium of claim 14, wherein the method further comprises capturing an image that has been focused in an automatic focus mode if the touch is released after the shutter button is released in the preview mode and before a drag occurs.

* * * * *